(No Model.)
P. H. ERTHEILER.
CIGAR BOX.
No. 571,945.  Patented Nov. 24, 1896.
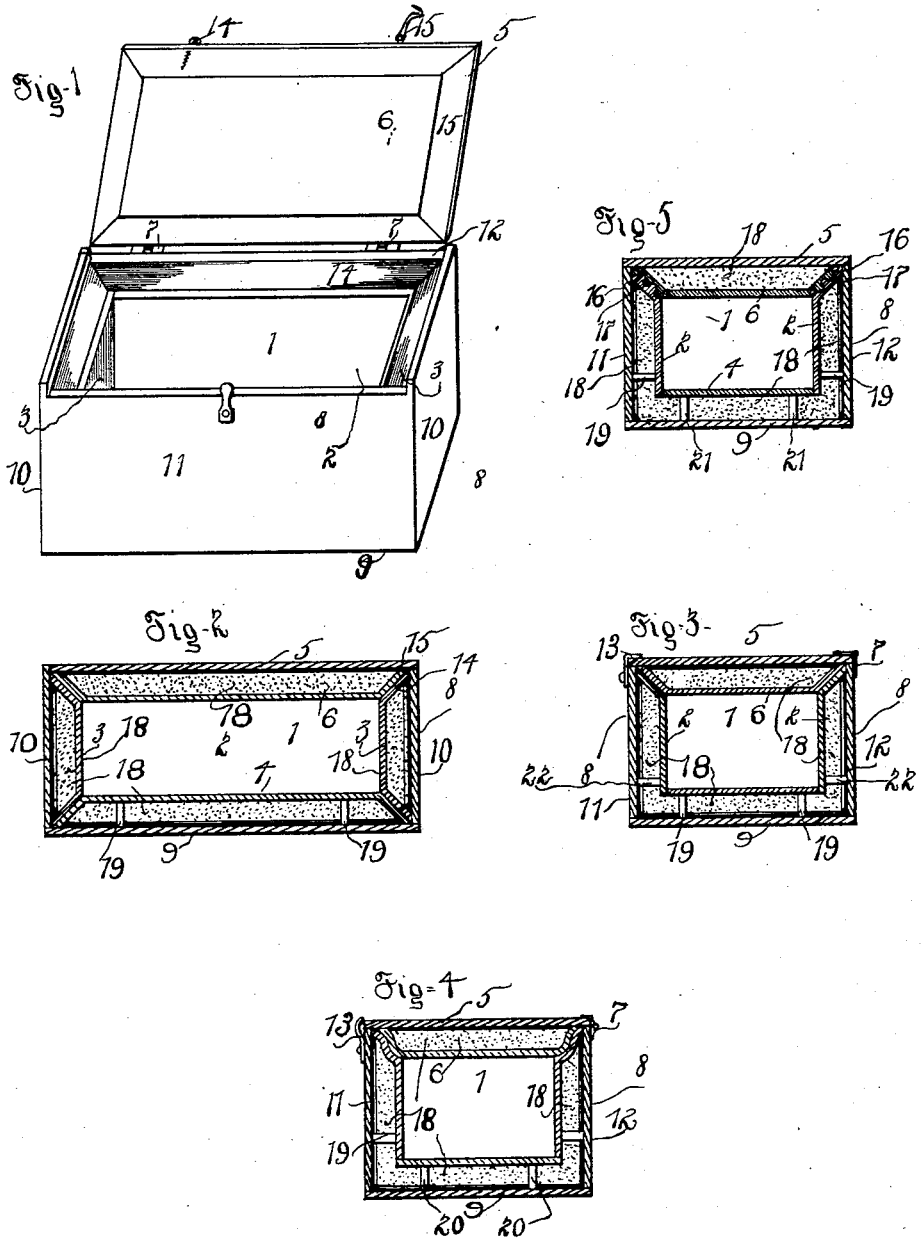
WITNESSES:
INVENTOR

UNITED STATES PATENT OFFICE.

PHILIP H. ERTHEILER, OF PHILADELPHIA, PENNSYLVANIA, ASSIGNOR TO WILHELMINA ZAUN ERTHEILER AND LOUIS ADELBERT BORNEMAN, OF SAME PLACE.

CIGAR-BOX.

SPECIFICATION forming part of Letters Patent No. 571,945, dated November 24, 1896.

Application filed March 13, 1896. Serial No. 583,044. (No model.)

*To all whom it may concern:*

Be it known that I, PHILIP H. ERTHEILER, a citizen of the United States, residing at Philadelphia, in the county of Philadelphia and State of Pennsylvania, have invented certain new and useful Improvements in Cigar-Boxes; and I do hereby declare the following to be a sufficiently full, clear, and exact description thereof as to enable others skilled in the art to make and use the said invention.

This invention relates to boxes for cigars, and has for its object the better preservation of the flavor and aroma of the cigars and the prevention of impairment by changes in hygrometric condition of the air and changes of temperature.

To this end this invention consists of a box having double walls including air spaces or chambers, which air-chambers are lined with a tissue or film impervious to moisture and charged with an absorbent which is innocuous to the material of the cigars, so that the flavor, odor, and aroma of the cigars are unimpaired by either evaporation or absorption from the atmosphere.

The construction and operation of the invention are hereinafter fully described, and shown in the accompanying drawings, in which—

Figure 1 shows in perspective view a box with the lid open, embodying this invention. Fig. 2 shows a vertical lengthwise section of the same. Fig. 3 shows a vertical transverse section of the same. Fig. 4 shows a modified form of the box; and Fig. 5 shows a modified form of the box-lid and the portion of the box in which it fits, drawn in section.

1 represents the cell or chamber of the box, surrounded by the walls or sides 2, ends 3, and bottom 4.

5 is the lid of the box, containing an air-cell 6. The lid is attached to the box by hinges 7 and may be provided with any of the usual fastenings, such as a spring-latch 13, screw 14, or hook 15, all of which are depicted in the drawings.

8 is the outer shell or casing, formed of the bottom 9, ends 10, front 11, and back 12. The upper part of the case is beveled inwardly at 14, so as to fit corresponding bevels 15 upon the lid. These bevels may be made in plane surfaces, as is shown in Figs. 1, 2, and 3, or curved lines or what is known as the "ogee" form, as shown in Fig. 4, or in reeds and shoulders 16 and 17, as shown in Fig. 5. An essential feature in all these forms is airtight fitting between the box and the lid.

To the inside surface of the outer box there is secured a lining of asbestos, waxed paper, paraffin-paper, or foil impervious to moisture. The outside surfaces of the inner case or cell may be similarly covered. The cells or air-spaces between the inner and outer boxes are filled with material having moisture-retaining properties and innocuous to the material of the cigars, the cut stems of tobacco from which the cigars are made answering the purpose, or it may be ground still finer in a condition known as "snuff." This absorbs the normal quantity of moisture and retains it, and in the event of any air leaking in the outer box acts as a defense against absorption by the inner box and prevents any circulation of air in the event of leakage, which might otherwise transmit moisture or heat by connection, and arrests all, or nearly all, of the evaporation which is due to boxes of usual construction under hygrometric or temperature changes of the atmosphere.

The filling (marked 18) in the air-cells of the box is confined in its position by a cement at the joints, plaster-of-paris answering, but any other cement which is not noxious or injurious to the tobacco may be substituted. The filling is introduced from the bottom and then cemented over and closed. The cell of the box is supported by strips 19, reaching across from one side to another, or by blocks 20, resting upon the bottom of the box, or by pillars 21 upon the bottom or bosses 22 from the sides and ends of the box, or by all of them.

Boxes thus made and closed are incapable of access by the atmosphere to them when the lids are closed, so that whatever cigars or tobacco is placed in the cell 1 is prevented from any change by currents of air in the cells, because the air is closely confined therein and air is prevented from entering the box by the close fitting of the lid, and the absorption from the contents by the material of the inner box is prevented by the waterproof or moisture-proof lining and the charge of filling.

It is found that in the finer grades of tobacco or cigars a very material deterioration occurs when packed in ordinary boxes, which deterioration is wholly avoided when the atmosphere is excluded and an envelop of dampened tobacco material is placed around it, so that the finest cigars, having the most delicate flavor and aroma, can be protected in these boxes from any deterioration through various changes of climate, either in temperature or moisture, or both, thus enabling parties to carry a larger stock of cigars with safety from deterioration than heretofore practicable, and permitting the keeping of the finest grade of cigars in establishments at distances remote from the place of manufacture or having a moderate or a slow sale therefor without in any degree impairing the quality of the goods.

Having described my invention, what I claim is—

1. An improved box for cigars, having an inner cell, adapted to receive cigars, and surrounding air-tight cells, in combination with a lining impervious to moisture in said air-tight cells, a filling of cut stems of tobacco in said cells, and a lid fitted to close tightly into the neck of the box, substantially as and for the purpose set forth.

2. In a box for storing and protecting cigars, an external case, and a cell within said external case, having an air-tight space around it, supports uniting said cell with the outer case, and an inclined rim or neck, uniting the open side of the inner cell with the upper or outer margin of the outer cell, in combination with a lid having air-tight spaces contained therein, also lined with moisture-impervious material and charged with the described absorptive material, and fitted to conform closely the fit in the beveled rim or neck, substantially as and for the purpose set forth.

3. In a box for storing cigars and protecting the same from impairment from climatic changes, a double-walled box containing air-tight cells within said walls, and lining material impervious to moisture applied to the interior surface of said air-tight cells in combination with the described absorptive material and cement for securing such absorbent material, in the cell, substantially as and for the purpose set forth.

PHILIP H. ERTHEILER.

Witnesses:
C. R. MORGAN,
LACEY D. CADWALLADER.